July 28, 1936.  Y. A. BOUGET ET AL  2,049,191
COMBINATION MATERIAL WORKING MACHINE
Filed Sept. 22, 1934  4 Sheets-Sheet 4

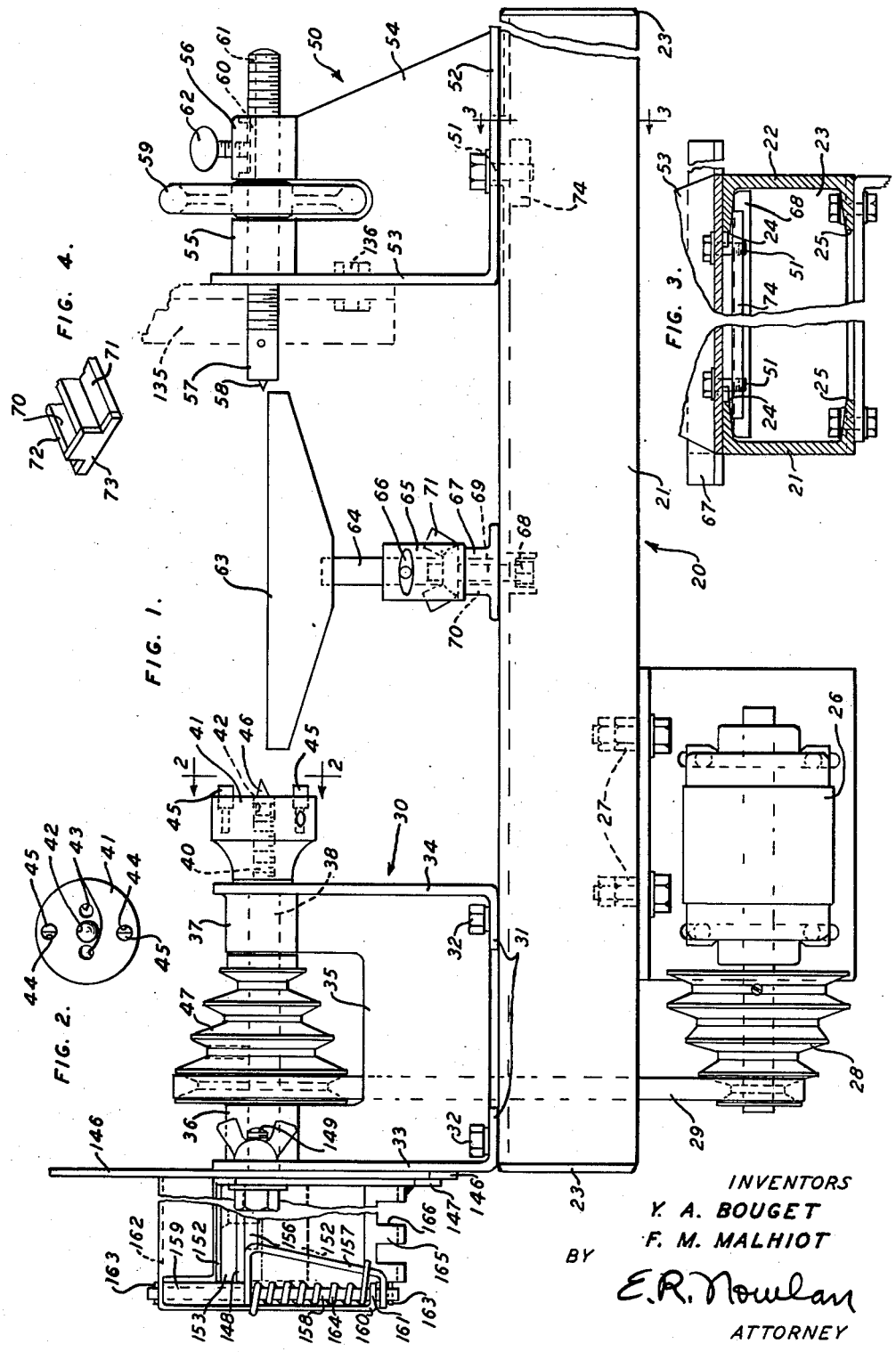

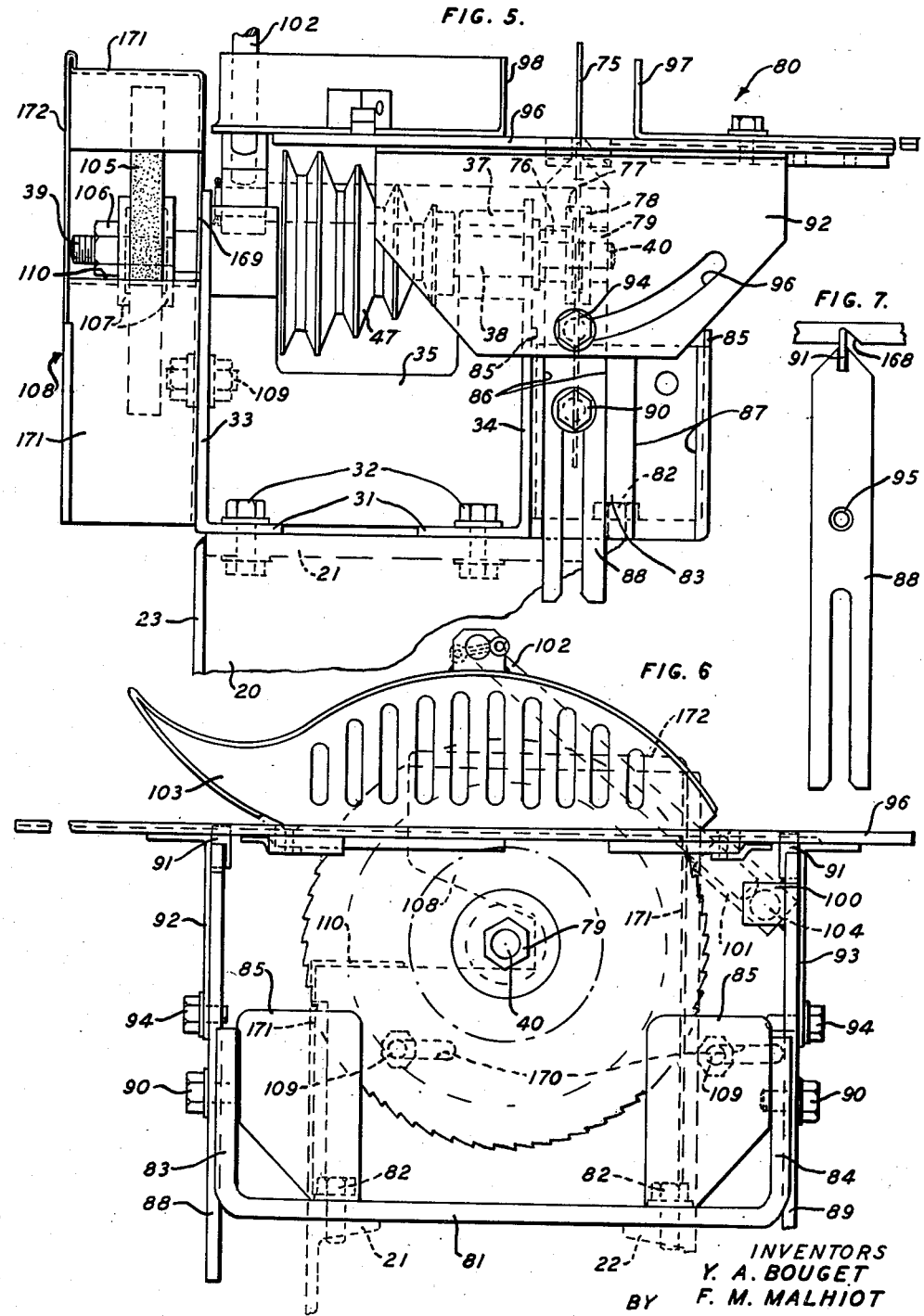

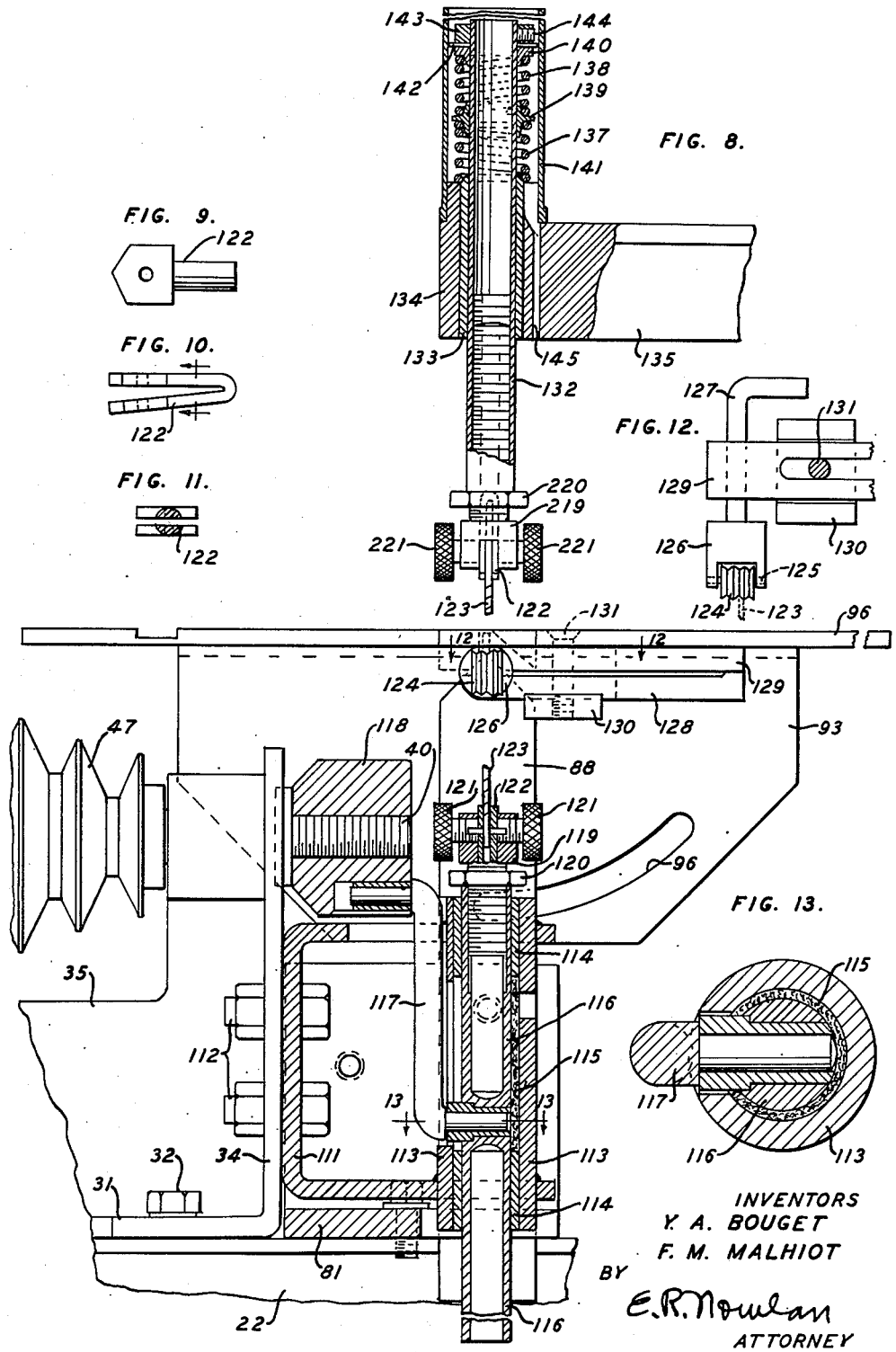

INVENTORS  Y. A. BOUGET
BY  F. M. MALHIOT

E.R. Moulan
ATTORNEY

Patented July 28, 1936

2,049,191

UNITED STATES PATENT OFFICE 2,049,191

COMBINATION MATERIAL WORKING MACHINE

Yves A. Bouget, West Orange, and Frank M. Malhiot, Wood-Ridge, N. J., assignors to Western Electric Company, Incorporated, New York, N. Y., a corporation of New York Application September 22, 1934, Serial No. 745,022

2 Claims. (Cl. 143—70)

This invention relates to combination material working machines and more particularly to a machine tool adaptable to be used as a lathe, circular saw, jigsaw, jointer and the like.

An object of the invention is to provide a machine tool of simple and rigid construction and capable of being easily and quickly adapted for use in a variety of operations.

With the above and other objects in view one embodiment of the invention may be in a wood lathe having a skeleton box shaped bed comprising a pair of channel shaped longitudinal side members of metal held rigidly together and spaced apart by means of transverse end members of metal preferably welded across the ends of the side members, the machine being further provided with a headstock and a motor therefor mounted on one end of the bed and with other auxiliary assemblies adaptable to be removably mounted on the bed for coaction with or to be driven by the headstock.

Other objects and characteristic features of the invention will appear from the following detailed description of one embodiment of the invention taken in connection with the accompanying drawings in which the same reference numerals are applied to identical parts in the several figures and in which Fig. 1 is a broken view in front elevation of a machine constructed in accordance with the invention;

Fig. 2 is an end view of the wood turning driving head;

Fig. 3 is a cross section on the line 3—3 of Fig. 1;

Fig. 4 is a detached broken view in perspective of one end of the tool rest base;

Fig. 5 is a broken view in front elevation of the left end of the machine with the grinding wheel unit and the circular saw unit mounted thereon and with the saw guard omitted for clarity;

Fig. 6 is a broken view thereof in right hand end elevation with the saw guard in place and the work guides removed for clarity;

Fig. 7 is a detached view of the saw table support;

Fig. 8 is a broken view in front elevation and partly in section on an enlarged scale of the jigsaw unit as mounted on the bed with the front plate omitted;

Fig. 9 is a detached face view of the jigsaw clamp;

Fig. 10 is an edge view thereof;

Fig. 11 is an end view thereof;

Fig. 12 is a detached plan view of the jigsaw guide;

Fig. 13 is an enlarged section on the line 13—13 of Fig. 7;

Figure 14:
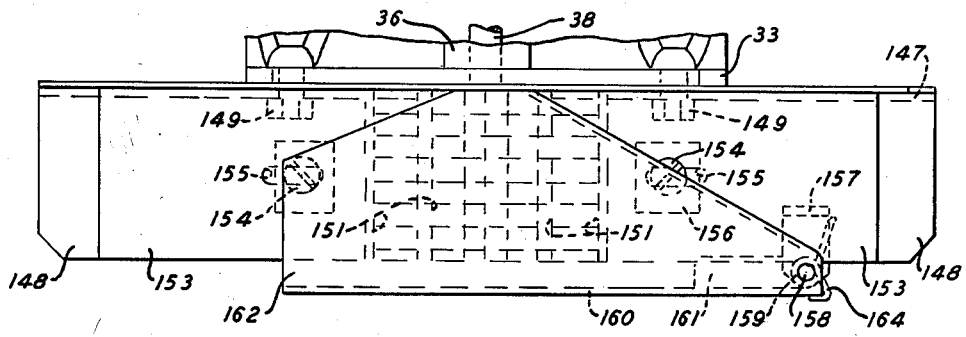
Fig. 14 is an enlarged plan view of the jointer or planer unit.

In the embodiment of the invention herein disclosed a wood working machine adaptable for a plurality of modes of operation has a main supporting member or bed 20 supported on legs or other means not shown. The bed 20 comprises a pair of parallel symmetrically positioned, longitudinal, channel shaped, front and rear members 21 and 22 which are rigidly spaced apart and held together by means of transverse end members 23 rigidly secured to the ends of the front and rear members preferably by welding, so that the front and rear members 21 and 22 and the end members 23, 23 form a substantially unitary parallelopipedal box of great rigidity as regards both bending and torsional stresses thereon. The oppositely facing edges of the upper, inwardly extending flanges of the front and rear channel members define between them a longitudinal slot 24 which serves to receive the various clamping means used to mount various tool units on the bed. The top surfaces of the two members 21 and 22 are machined to lie in one substantially flat and horizontal plane, and the inner edges of the flanges which define the slot 24 are made substantially vertical and mutually parallel planes to serve as guides. A similar slot 25 is defined between the bottom flanges of the members 21 and 22 and serves to allow chips and dirt entering the box to fall through or be removed and also gives access to the under side of units mounted on the bed.

A motor 26 is mounted on the vertical wall of an L shaped support, the top horizontal wall being bolted as at 27 or otherwise secured to the under side of the bed near the left end thereof. The motor is preferably provided with a stepped grooved driving pulley 28 to receive a belt 29 which passes up through the slots 24 and 25. The motor is fed with electric current through line wires and a control switch not shown.

On the upper face of the bed at the left end thereof is rigidly secured a headstock frame 30 having flat horizontal base 31 portions secured to the bed as by bolts or screws 32, and having integral therewith spaced upstanding left and right end walls 33 and 34 extending transversely of the bed. A generally U shaped central vertical wall 35 extends across between the end walls and is formed at its two upper ends with integral enlargements 36 and 37 in which is journalled a horizontally disposed shaft 38 having a pair of central threaded coaxial stubs 39 and 40 extending out beyond the walls 33 and 34. Preferably for cheapness, lightness and rigidity the headstock construction comprises making the transverse walls 33 and 34 integral with the base portion 31 by bending from sheet steel. The center wall 35 is cut from similar material and welded along its edges to the walls 33 and 34 and to the base portion 31. The bearing portions 36 and 37 may be simply and cheaply made from heavy walled tubing or from axially drilled rod stock, and are likewise welded to the sidewalls 33 and 34 and to the upper edges of the center wall 35. The structure thus created is cheaper and lighter than a commensurately strong and rigid casting.

In Fig. 1, the machine is shown as adapted for use as a wood turning lathe. To this end a driving head 41 having a central longitudinal bore 42 threaded to coact with the stub 40 is mounted thereon. The head 41 is also provided with two pairs of recesses 43, 43 and 44, 44 located at different radial distances from the axis of the head and adapted to receive a pair of chisel edged driving dogs 45, 45. The central bore 42 is further formed at its right hand end to receive a center point 46. A stepped pulley 47 to be driven by the belt 29 is secured to the central part of the shaft 38.

A tailstock frame 50 is mounted adjustably on the top face of the bed 20 as by bolts 51 and a transverse clamp member 74. This frame 50 comprises preferably a flat horizontal base portion 52 and an integral transverse vertical wall 53 formed from one piece of sheet stock. A central longitudinal wall 54 of sheet stock is welded along its bottom edge and left hand edge to the base 52 and vertical wall 53 respectively. Bearing portions 55 and 56 are welded in place as shown in Fig. 1, portion 55 to the wall 53 and to the wall 54, and portion 56 to the wall 54.

A threaded tail center 57 having a center point 58 is slidably mounted in the bearings 55 and 56 in coaxial alignment with the shaft 38, and is longitudinally adjustable by means of a hand wheel 59 threaded thereon between the bearings. The center 57 is kept from rotating by means of a key 60 mounted in the bearing 56 and riding in a slot 61 formed longitudinally in the center body. A thumbscrew 62 mounted in the bearing 56 and abutting at its end against the key 60 serves to clamp the center 57 in adjusted position.

A tool rest 63 of conventional form is mounted on a post 64 which is vertically adjustable in a socket 65 by means of a clamp screw 66. The socket 65 is mounted on and secured as by welding to a base 67 having generally an inverted T cross section. The base 67 rests on and extends transversely across the bed 20, and is formed with a central vertical slot 70 throughout all of its length except for its end walls. A clamp 68 of inverted channel cross section is positioned within the bed 20 parallel to the base 67 and abutted against the under surfaces of the upper flanges of the bed members 21 and 22. A clamp bolt 69 has its head in the channel of the clamp 68 and its body extends up through a perforation therefor in the web of the clamp 68, through the slot 24 and through the slot 70 in the base 67. A wing nut 71 on the upper end of the bolt 69 serves to clamp the member 68, the bed 20 and the base 67 together thus holding the tool rest 63 in place. Loosening the nut 71 permits the base 70 to be adjusted along the bed 20 together with the clamp 68 and also permits the base 67 to be adjusted transversely of the bed 20 by moving relatively to the clamp 68 also, the bolt 69 sliding in the slot 70. If desired a pin, stud, lug or the like may be rigidly mounted on the clamp 68 to extend up into the slot 70 and coact with the bolt 69 to prevent rotational relative movement of the clamp 68 and base 67.

Preferably, for cheapness and lightness, the base 67 may be made of a pair of angle beams 71 and 72 positioned back to back in parallel spaced relationship, defining the slot 70 between them and held together and spaced apart by a correspondingly inverted T-shaped flat plate 73 welded across the ends of the bars 71 and 72 at either end thereof.

It will be noted that all of the structural elements of the frames and supports thus far described as pertaining to the machine are made from commercial tubes or beams of stock sections or from simple cut and bent sheet metal and are welded together. Clumsy and cumbersome as well as relatively brittle members of cast metal are completely obviated.

Figure 15:
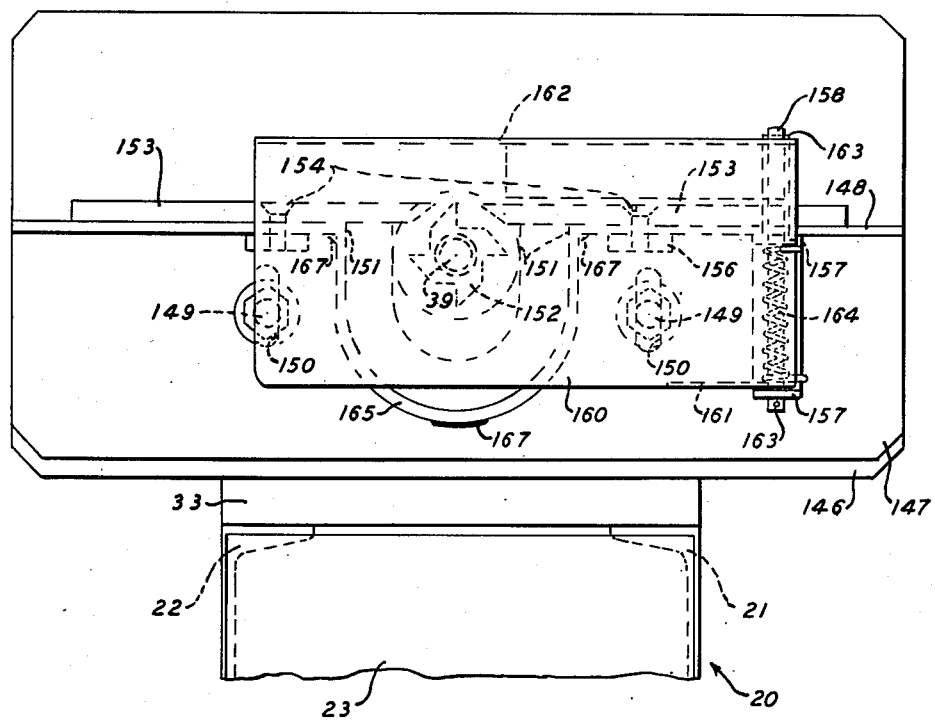
Fig. 15 is an enlarged view thereof in left hand end elevation.

In Fig. 1, for convenience of illustration, the jointer unit further disclosed in Figs. 14 and 15 is shown in position on the machine but will be described later in detail in connecton with the latter figures.

Figs. 5 and 6 show a circular saw unit and a grinding unit set up simultaneously for convenience of illustration, although either may be used alone. The saw and its appurtenances are at the right side of the pulley 47 and the stone at the left. The saw 75 is centrally perforated and mounted on the stub 40 with a spacing collar 76 and a saw clamp 77 between the saw and the journal 37. On the other side of the saw are a saw clamp 78 and a lock nut 79 threaded on the stub 40 whereby the saw is secured on the stub 40 of the shaft 38 to be driven thereby.

A saw table 80 is provided to carry work to the saw. This table comprises a base member 81 consisting of a relatively heavy rectangular metal plate secured across the top of the bed by bolts or screws 82. The two ends, front and back, are turned up as vertical flanges 83 and 84. At the right and left hand sides vertical transverse partial walls 85 of relatively thin sheet metal are welded in place. Two vertical channels or guide ways 86 and 87 are cut in the outer face of each flange 83 and 84. In the left hand guideway 86 of each flange is slidably mounted one of a pair of identically similar support members, 88 in front and 89 in the rear. Each of the members 88 and 89 has a median longitudinal slot in its lower portion through which passes a clamp screw 90, 90 mounted in the corresponding flange 83 or 84 for clamping the members 88 and 89 in vertically adjusted position.

The upper end of each of the members 88 and 89 is tapered (Fig. 7) and vertically slotted and a round ended bearing piece 91, 91 is welded in place in each of the slots. A flat supporting plate 92 or 93 is positioned vertically against the outer face of each member 88 or 89 and clamped thereto by a clamp screw 94, 94 mounted in the member, in a threaded hole 95 therein. The screw 94 passes through an arcuate slot 96 in the plate 92 or 93 as the case may be, the slot having its center of curvature at the tip of the bearing piece 91, so that the plate may be swingingly adjusted on the member about the tip of the bearing piece as a center. The top edge of each plate 92 or 93 is turned out at right angles to form a flange which is welded to the under face of a flat generally rectangular table top 96 which is thus supported to be adjustable for height by means of the screws 90 and for inclination to the planes of the saw by means of the screws 94.

The under side of the table top 96 is formed with angular or arcuate notches 168 to receive the tips of the bearing pieces 91 and these notches are so proportioned that the axis about which the table is tiltable lies very near the top or working surface of the table. Hence the customary slot through which the saw passes may be made narrow. Adjustable guides 97 and 98 for the work are mounted on top of the table.

The rear supporting member 89 has a block 100 welded thereto in which is supported a stationary shaft or spindle 104 extending horizontally therefrom to the left. A block 101 is pivoted at the left end of the spindle and carries one end of a gooseneck arm 102, the other end of which overhangs the saw and carries a saw guard 103 pivoted thereon.

The grinding unit comprises a grinding wheel or stone 105 mounted on the stub 39 of the shaft 38 by means of a nut 106 and clamps 107. A guard or housing 108 surrounds the wheel 105 and is secured to the headstock wall 33 by bolts 109. A tool grinding rest 110 is mounted in the work opening of the housing 108. The housing 108 comprises a vertical inner wall 169 of sheet metal, generally C-shaped, which rests against the outer face of the wall 33 and is secured thereto by the bolts 109 which pass through horizontal slots 170 in the wall 169. The wall 169 is formed at its two front edges and at its top and rear edges with integral flanges 171 extending out to the left at right angles to the wall. A vertical sheet metal outer wall 172 of shape generally like that of the wall 169 is secured to the outer edges of the flanges 171, as by crimping the edges thereof over the everted edges of the flanges. The work rest 110 is carried on the front edges of the opening of the C at a level just below the level of the axis of rotation of the wheel 105. Thus since the housing as a whole may be adjusted forward and back horizontally on the bolts 109 the tool rest remains at the proper height relative to the wheel for a considerable range of wheel diameters.

Figs. 8 to 13 inclusive show the jigsaw unit, in which the same saw table 96 is used as just described in connection with the circular saw unit. A C-shaped support 111 is secured to the outer face of the headstock wall 34 by bolts or screws 112 and a vertical tubular sleeve 113 is welded to the support 111. A collar 114 is secured within each end of the sleeve and between these two collars is a split lubricating sleeve 115 of felt within the sleeve 113. A pitman 116 slides in and is guided by the collars 114 and is driven in vertical reciprocation by a link 117, one end of which is journalled in the pitman and the other end of which is eccentrically journalled in a driving head 118 mounted on the stub 40 of the shaft 38. The sleeves 113 and 115 are slotted to pass the pitman.

In the upper end of the pitman 116 is an axial threaded bore to receive the correspondingly threaded stem of a saw clamp base 119. A lock nut 120 is threaded on the stem to lock it in position in the pitman. The upper end of the base 119 is axially bored and recessed to receive a folded saw clamp 122. Clamp screws 121 are mounted in the pitman head to close the clamp on the lower extremity of a saw 123 placed therein.

A saw guide roller 124 is supported just below the under side of the saw slot in the table 96 in position to bear against the rear non-serrated edge of the jigsaw blade 123, on a pin 125 mounted in a recessed block 126 secured to a rod 127 supported between clamping blocks 128 and 129 held together and against the under side of the table by a clamp 130 and a screw 131.

Above the table 96 and in vertical alignment with the clamp 122 is an identically similar clamp 222, carried in a member 219 similar to the member 122, and clamped by screws 221, 221. The threaded stem of the member 219 is screwed into threaded tube 132 and locked in place by a nut 220. The tube 132 is slidably supported in a vertical sleeve 133 mounted in an upper head 134 secured to the end of a supporting beam 135. The beam 135 is a T-beam extending horizontally to the right and then curved down so that its right end rests against the front face of the tail-stock 50 as shown in dotted lines in Fig. 1 where it is secured by bolts 136.

The tube 132 is supported on the head 134 by two compression springs 137 and 138 surrounding the tube. The lower end of the spring 137 abuts against the head 134 and its upper end both abuts against and grips a collar 139 loosely encircling the tube. The lower end of the spring 138 both grips and abuts against the collar and its upper end abuts against an annular stop 140 secured near the top of the tubes. The two springs are coiled in opposite directions so that each nullifies the tendency of the other to rotate the tube 132 and therewith the saw as the springs are compressed and released.

An outer tube 141 is mounted on the head 134 concentric to the tube 132 and a washer 142 of suitable material such as leather or rubber is gripped between the stop 140 and a collar 143 held on the tube 132 by a jam screw 144. The head 134 is provided with a passage 145 leading from the annular space between the tubes 132 and 141 and when in action the washer 142 pumps an intermittent jet of air from the passage 145 to blow chips away from work and saw.

Figs. 14 and 15 and the left hand end of Fig. 1 show a jointer or planer unit in position for use. This comprises a principal vertical supporting plate 146 applied against the outer face of the left wall 33 of the headstock, and a second plate 147 welded flatwise thereto and bent over horizontally at the top to form a table 148. These two conjointed plates are held adjustably in place against the member 33 by bolts 149 passing through vertical slots 150 in the plates 146 and 147. The table 148 is divided into front and rear halves by a broad slot 151 to allow a rotary cutting tool 152 to project up therethrough, the tool being mounted on the stub 39 of the shaft 38. A pair of slabs 153 of maple wood or other suitable material are supported on the table 148 and are adjustably held thereon by screws 154 passing through slots 155 in the table and entering clamp blocks 156.

A guard post support 157 consisting of a generally C-shaped strip of sheet metal is welded to the under side of the left front corner of the table 148 and extends its ends out beyond the left edge of the table. A post 158 is journalled in the support. The upper portion of the post is surrounded by a sleeve 159 whose lower end rests on and is supported by the upper face of the support 157.

A guard has a vertical outer wall 160 formed at the bottom with an integral inturned flange 161 perforated to fit over the post 158 which extends down therethrough. The guard also has an integral horizontal top or roof 162 likewise perforated to fit over the post 158 which extends up therethrough. The sleeve 159 abuts at its upper end against the under surface of the top 162 thus supporting the guard on the top of the C-shaped support 157. The post 158 is held against displacement by cotter pins 163. A spiral spring 164 surrounds the post 158 and has its lower end hooked over the support 157 and its upper end hooked over the edge of the vertical guard wall in such a way as to yieldingly resist pivotal motion of the guard as a whole about the post in a counterclockwise direction as seen from above. The guard is further formed with an integral front wall depending vertically from the roof in a direction slanting from left front to right rear so that when a piece of work is pushed rearwardly over the blocks 153 the guard is swung yieldingly out to the left. A roughly semicylindrical guard 165 is permanently positioned under the table and around the tool, and is longitudinally slotted as at 166 to allow chips and debris from the work to fall through. The guard is secured to the table 148 and to the plate 147 as by welding as shown at 167, thus aiding to support and stiffen the table.

The apparatus thus disclosed is self-evidently adaptable to the principal operations required in woodwork but the principles embodied may also be applied in a metal working machine or other analogous apparatus. It will be noted that no castings except possibly the tail stock adjusting wheel 59 are required, but the entire apparatus is composed of parts which can be simply and cheaply made from stock beams of standard cross-section or from sheet metal and that only cutting and bending operations are requisite for its construction as regards the principal members. No drawing or stamping operations are needed. Thus ordinary machine shop tools only are required with no expense for heavy press work or expensive press tools or for foundry work and molds.

The embodiment of the invention herein disclosed is illustrative merely and may be modified and departed from in many ways without departing from the spirit and scope of the invention as pointed out in and limited only by the appended claims.

What is claimed is:

1. In a machine tool, a bed comprising two longitudinal metal beams having a channel section and spaced apart and held together in substantially parallel relation by metal plates welded across the ends thereof in combination with a jigsaw head support comprising an end wall of sheet metal having one end bent at right angles to form an integral base portion, a central wall of sheet metal perpendicular to the side wall and to the base portion and welded to both, and a supporting arm consisting of a beam having a vertical portion secured to the side wall and an integral horizontal portion.

2. In a machine tool, a jigsaw head unit comprising an end wall of sheet metal having one end bent at right angles to form an integral base portion, a central wall of sheet metal perpendicular to the side wall and to the base portion and welded to both, and a supporting arm consisting of a beam having a vertical portion secured to the side wall and an integral horizontal portion, in combination with a head mounted on the horizontal portion of the supporting arm and comprising a housing mounted in the arm for reciprocation therein, a compression spring within the housing and abutting against the housing and the arm, and a saw clamp mounted in the housing.

YVES A. BOUGET.
FRANK M. MALHIOT.